(12) United States Patent
Delaporte

(10) Patent No.: US 6,215,393 B1
(45) Date of Patent: Apr. 10, 2001

(54) SAFEGUARDED SYSTEM FOR MONITORING THE PRESSURE OF A TIRE

(75) Inventor: Francis Delaporte, Osny (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 09/573,942

(22) Filed: May 19, 2000

(30) Foreign Application Priority Data

May 28, 1999 (FR) .................................................. 99 06752

(51) Int. Cl.[7] .................................................. B60C 23/00
(52) U.S. Cl. .................. 340/447; 340/442; 73/146.4; 73/146.5
(58) Field of Search .......................... 340/442, 445–448; 73/146.4, 146.5

(56) References Cited

U.S. PATENT DOCUMENTS

| 3,835,451 | 9/1974 | Church ..................................... 340/58 |
| 4,734,674 | 3/1988 | Thomas et al. ......................... 340/58 |
| 5,231,391 | * | 7/1993 | Rigaux ................................. 340/442 |
| 5,497,657 | * | 3/1996 | taguchi et al. ...................... 73/146.2 |
| 5,837,891 | 11/1998 | Bridge ................................. 73/146.8 |

* cited by examiner

Primary Examiner—Daniel J. Wu
(74) Attorney, Agent, or Firm—Vorys, Sater, Seymour and Pease LLP

(57) ABSTRACT

The safeguarded system for monitoring the pressure of a tire (8) of a vehicle wheel comprises a pressure sensor (1), a transmitter (3) of series of identical bursts of pressure data and a processor (2) for controlling the transmission of the bursts of data, arranged in order that, at least at wheel rotation speeds higher than a threshold, at least one burst of a series is transmitted in its entirety upon one wheel rotation.

4 Claims, 2 Drawing Sheets

SAFEGUARDED SYSTEM FOR MONITORING THE PRESSURE OF A TIRE

BACKGROUND OF THE INVENTION

A system for monitoring the pressure of a tire of a vehicle wheel serves to indicate incorrect pressure to the on-board computer of the vehicle in order for it to alert the driver promptly.

A system of this type, attached to the valve inside the tire is thus inaccessible and power must be drawn in moderation from the battery which supplies it. To this end, the pressure-value radio transmissions are discontinuous, with, for example, a cycle of six minutes when the vehicle is moving and one hour when stationary. It is thus necessary to ensure that the result of each measurement is well received in order for the cycle of information not to be extended undesirably.

To this end, each measurement is transmitted with redundancy in the form of a series of a number of bursts of bits of information relating to the pressure. For example, in a standard manner, three bursts of 50 ms are transmitted with a spacing of about looms. Each wheel thus transmits its data in a random manner with respect to the others, and possible collisions in the transmissions of two wheels do not generally affect the totality of the bursts of a series. The redundancy, ie. the number of repetitions of transmission of each measurement, is thus determined according to the random risk of such radio collisions.

The Applicant has noted, however, that above a certain vehicle speed, the correct reception of the bursts was no longer assured, this means that a number of bits of each burst were erroneous and this caused the total loss of each burst. The redundancy lost all effectiveness. It is even possible to speak in terms of fading of the transmission data.

The Applicant has thus observed, especially at high speeds, that upon each rotation of the wheel, the pressure-monitoring system temporarily lost radio contact with the on-board computer over a specific angular sector linked to the presence of metal masses of the chassis and of the wheel, forming a screen. This was therefore not a question of random events, which explained the ineffectiveness of the redundancy.

Thus the Applicant proposes the following solution to the problem of transmission of remote readings from a tire of a wheel.

SUMMARY OF THE INVENTION

The invention thus relates to a safeguarded system for monitoring the pressure of a tire of a vehicle wheel comprising
a pressure sensor,
a transmitter of series of identical bursts of pressure data,
a processor for controlling the transmission of the bursts of data, arranged in order that, at least at wheel rotation speeds higher than a threshold, at least one burst of a series is transmitted in its entirety upon one wheel rotation.

Thus, for each burst, the probability is good that its transmission will take place outside a period in which the transmitter-receiver connection is cut and the redundancy linked to the transmission of a number of bursts increases the overall probability that at least one of the bursts is transmitted correctly to the on-board computer for utilising these bursts.

Since the invention relates to the transmission of data, it is conceived that the system can transmit data other than those relating to pressure, such as, for example, temperature and wheel identification.

The transmitter is advantageously of the frequency modulation type.

The computer for utilising this data thus receives a signal in which the information linked to the frequency is independent of the signal level received. This avoids any necessity for monitoring the gain of the demodulated signal which, in amplitude modulation, is difficult to achieve by reason of the fact that the radio level received varies continuously and with large dynamics by reason of the presence of the metal masses, and that it is thus impossible to determine an average reference level.

BRIEF DESCRIPTION OF THE DRAWINGS

The invention will be better understood with the aid of the following description of a preferred embodiment of the monitoring system of the invention, with reference to the attached drawing in which.

DETAIL DESCRIPTION OF THE INVENTION

Figure 1:
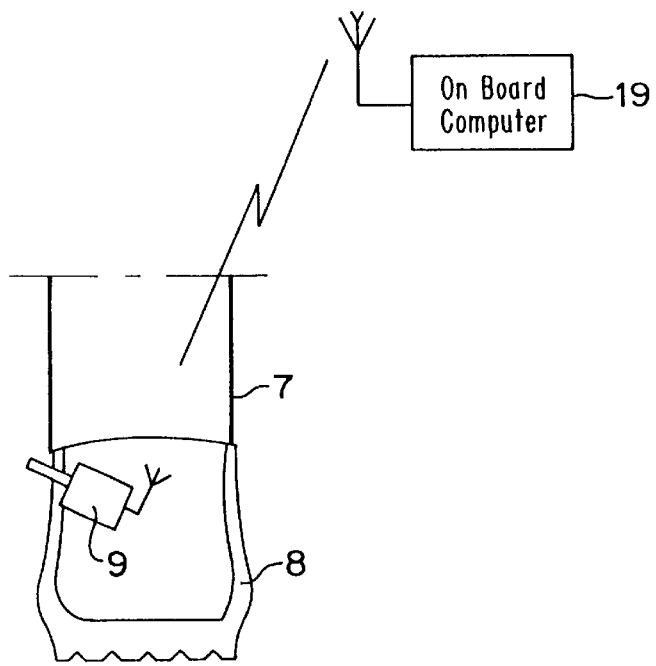
FIG. 1 is a schematic illustration of the monitoring system of the invention, housed in a tire of a wheel of an automobile vehicle, of which the on-board computer utilises the readings.
Figure 2:
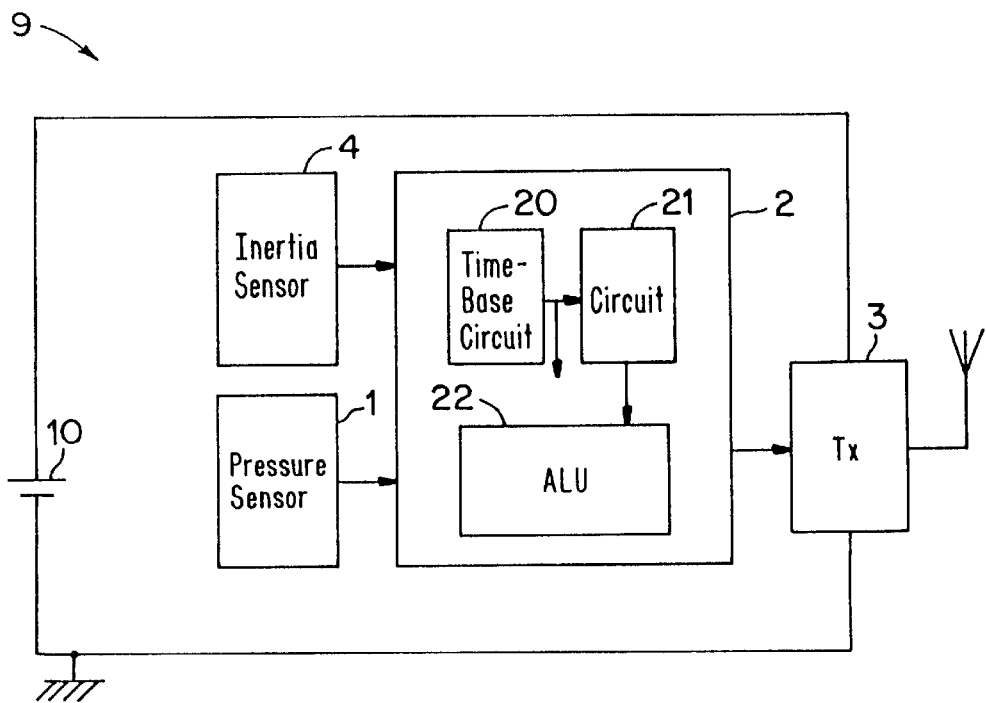
FIG. 2 is an electric operational block diagram of the telemetry system of FIG. 1.

The safeguarded system illustrated, referenced 9, for monitoring vehicle tire pressure by telemetry is housed in a tire 8 of a wheel 7 of a vehicle, in this case an automobile, and is attached to its valve. It comprises a pressure sensor 1 connected at the output to a processor 2, in this case a microprocessor, which controls a wireless transmitter 3, in this case a radio transmitter. The transmissions thereof are received by an on-board computer 19 of the vehicle which utilises them to provide an alarm signal if necessary. A battery 10 powers all the above-mentioned circuits of the system 9.

The microprocessor 2 comprises a time-base circuit 20 which clocks the operation thereof and, in particular, controls a circuit 21 for placing the other circuits of the microprocessor 2, such as a calculation unit (ALU) 22, on standby or for activating them.

The system operates in the following manner.

The time base 20 controls the circuit 21 by clock signals which the latter counts in order to activate cyclically, in this case every two seconds, the circuits of the microprocessor 2 in order possibly to transmit, under the control of the calculation unit 22, a series of N bursts of pressure telemetry, in this case N=3, then to place these circuits (22) once more on standby. A transmission of this type takes place in a cycle of six minutes if the wheel is turning, which an inertia sensor 4, such as a Reed bulb, indicates to the microprocessor 2. Otherwise, at rest, the cycle is of 1 hour.

The microprocessor 2 for controlling the transmission of the bursts of data transmits the corresponding data to the transmitter 3 at a speed greater than a low transmission threshold, such that, at least at speeds of rotation of the wheel 7 which are higher than a threshold, at least one burst of a series is transmitted in its entirety upon one rotation of the wheel 7.

More precisely in this case, the transmission of each burst is of a duration equal to a specific fraction of the duration of one rotation of the wheel when the vehicle is moving at a specific maximum speed. Taking, for example, a threshold speed of 300 km/h, one rotation of the wheel corresponds to 24 milliseconds. In this example, the duration of a burst represents a third of this value, or 8 ms.

Figures 3, 4:
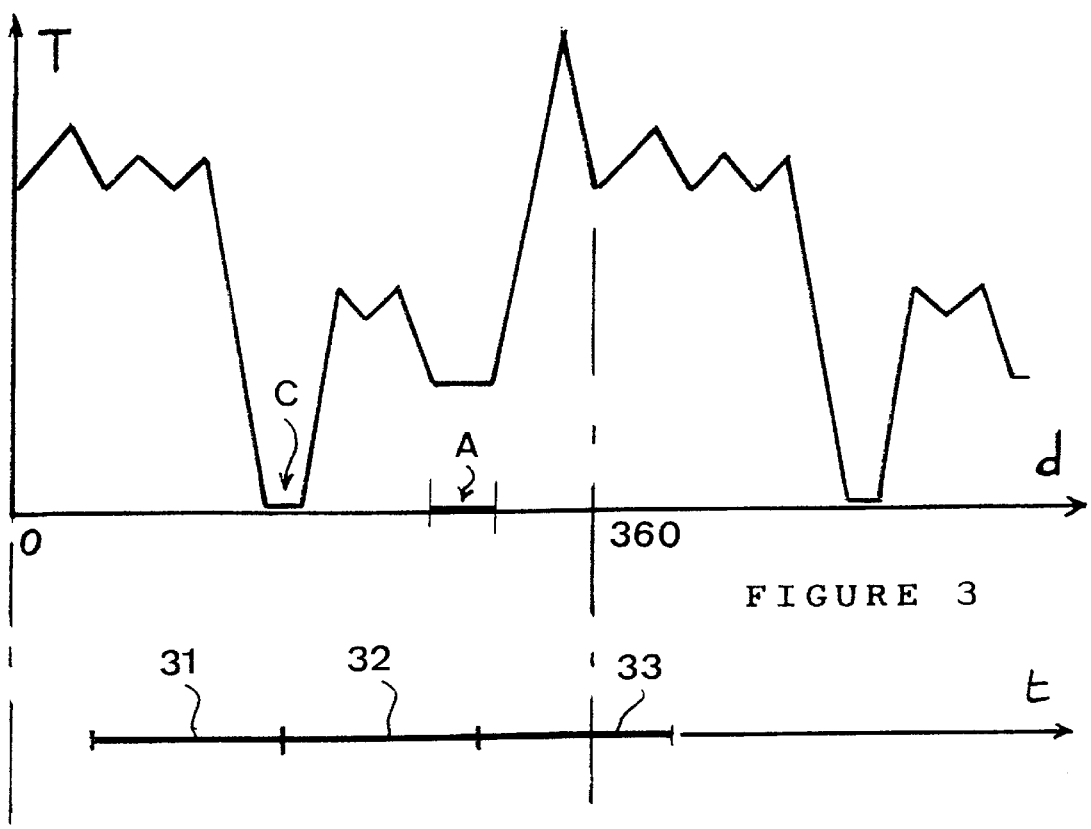
FIG. 3 illustrates the variations, over one rotation of the wheel, of the level of the radio signal received by the computer.
FIG. 4 illustrates, with respect to FIG. 3, the moments of transmission of the bursts of a series of signals of pressure telemetry.

FIG. 3 shows, over one rotation of the wheel 7, the level received by the on-board computer 19, and thus also represents the radio transmission coefficient T. It will be noted that the transmission curve T has a range C of about 10 degrees at substantially zero transmission, by reason of the presence of metal masses of the vehicle, and a range A in which the connection can remain established but with high attenuation. In a general way, even outside the ranges A, C, the level received fluctuates within broad limits.

FIG. 4 illustrates over time t and with regard to the angular position of the wheel 7 determined by FIG. 3, the successive periods 31, 32, 33 for transmission of bursts of a series, of a duration of 8 ms each. At the threshold speed the probability is zero that the transmission of the three bursts 31, 32, 33 will take place in the angular sector or dead angle rotation position C of the wheel 7, in which the radio connection to the on-board computer 19 is cut. More precisely, as each period 31, 32, 33 of transmission of a burst extends over a duration corresponding to a rotation of 120 degrees, it has almost two chances out of three (360–120–10/360) of being located outside the dead angle C of 10 degrees.

Furthermore, if the N=three bursts are transmitted in uninterrupted succession, ie. over one rotation of the wheel at this speed, at most two of these bursts (periods 31, 32) could be affected by the dead angle C in their neighbouring extreme zones, and the third burst period 33) is received with certainty.

In order to increase the probability further that the on-board computer 19 could utilise the data received, the calculation unit 22 calculates and adds, in this example, redundancy bits, auto-correction code data to the bits of pressure-measurement data and to bits identifying the wheel 7, in order to tolerate the loss of reception of a specific number of bits.

In order to overcome fluctuations in transmission T, the transmission of the data is effected in this example by modulation of frequency and not of amplitude, ie. by jumps of a carrier between a frequency f0, representing a logic 0, and a frequency f1, representing a logical 1.

In the on-board computer 19, a demodulator FM with a high input gain provides a voltage varying with the value of the frequency received, this voltage thus having two possible values, logic 0 and 1. Variations in amplitude of the signal received from the wheel 7 are thus overcome upon each rotation thereof.

In this example, when the system 9 transmits the bursts of a series in a spaced manner, it nevertheless continues its transmission between the bursts by transmitting one of the carriers, in this case f0, or possibly a predetermined pattern of bits by modulation f0/f1. Thus the microprocessor 2 controls the transmitter 3 to transmit a carrier, modulated or unmodulated, over the whole duration of each series.

The on-board computer 19 can thus, by detecting the corresponding state "0", determine the angular position of the wheel 7, disappearance of the carrier f0 during reception indicating the angular position of the range C. The range C thus serves as a negative synchronisation pulse of the on-board computer 19 on the wheel 7. The wheel speed 7 can thus be determined by successive detection processes. The on-board computer 19 determines, in the periods 31, 32, 33 of the bursts received, the possible presence and the position of the range C and/or of the range A by a measurement of level in order to allocate a low level of confidence to the corresponding bits and to correct them according to those received outside these ranges A, C.

I claim:

1. Safeguarded system for monitoring the pressure of a tire of a vehicle wheel comprising
    a pressure sensor,
    a transmitter which transmits a series of identical bursts of pressure data,
    a processor which controls the transmission of the bursts of data, arranged in order that, at least at wheel rotation speeds higher than a threshold, at least one burst of a series is transmitted in its entirety upon one wheel rotation.

2. System according to claim 1, wherein the transmitter is a frequency modulation transmitter.

3. System according to claim 2, wherein the processor and the transmitter are arranged to transmit a carrier throughout the duration of each series.

4. System according to claim 1, wherein the processor is arranged to add redundancy data to the pressure measurement data.

* * * * *